July 17, 1956  W. N. KILNER  2,755,395
DYNAMO ELECTRIC MACHINES
Filed Nov. 30, 1953  3 Sheets-Sheet 1

INVENTOR
William Norman Kilner
By Morris & Bateman
ATTORNEYS

July 17, 1956  W. N. KILNER  2,755,395
DYNAMO ELECTRIC MACHINES
Filed Nov. 30, 1953  3 Sheets-Sheet 2
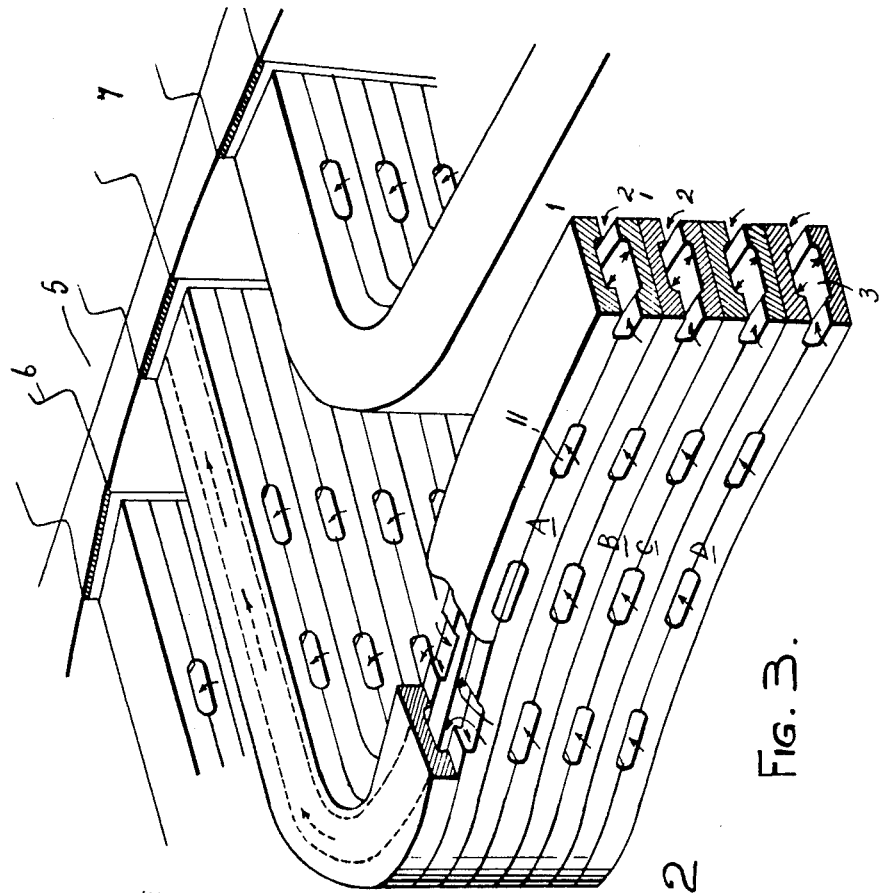
Fig. 3.
Fig. 2
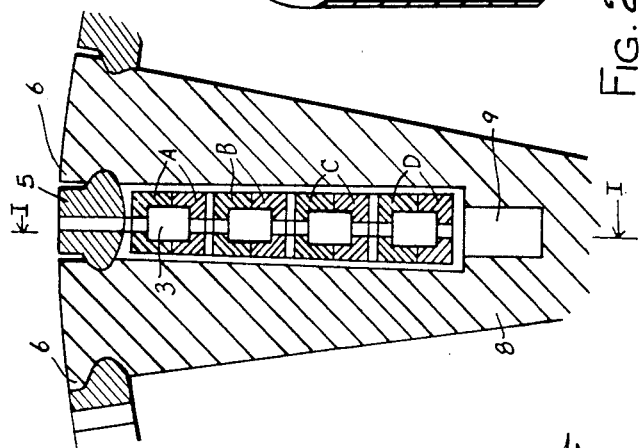
INVENTOR
William Norman Kilner
By Norris & Bateman
ATTORNEYS

United States Patent Office 2,755,395
Patented July 17, 1956

2,755,395

DYNAMOELECTRIC MACHINES

William Norman Kilner, Hale, England, assignor to Metropolitan-Vickers Electrical Company Limited, London, England, a company of Great Britain Application November 30, 1953, Serial No. 395,219

Claims priority, application Great Britain December 2, 1952

2 Claims. (Cl. 310—64)

This invention relates to dynamoelectric machines and has an important application in large size turbo-alternators.

It is well known that one of the main factors limiting the output of a large dynamoelectric machine, such as a turbo-alternator, is the rise in temperature; this in turn depends upon heat dissipation. The limiting temperature rise is, of course, the temperature rise of any individual part or component. The usual methods of cooling, such as blowing air through the machine, cool the external surfaces of the cores but may provide insufficient cooling for interior parts, such as the emedded parts of the conductors themselves.

The present invention is concerned with improving the cooling of the rotor conductors.

The present invention comprises a dynamoelectric machine in which the rotor conductors are formed with longitudinal ducts for cooling gas with inlet ports in the sides i. e. radial faces of the exposed and turns of the winding and with discharge passages in the embedded parts of the winding, which discharge passages extend between the ducts and the rotor periphery.

The rotor may, in addition, be provided with sub-slots, i. e. axial ducts extending beneath the winding slots which are fed with gas at the ends, and discharge through the radial discharge passages.

According to a preferred arrangement, the radial discharge passages which are located along the mid part (i. e. axially) of the rotor, are fed from the sub-slots, and the discharge passages towards the ends of the rotor are fed through the conductor ducts.

The gas herein referred to may be air or hydrogen or other suitable gas.

In order that the invention may be more clearly understood, reference will now be made to the accompanying drawings, in which:

Fig. 2 is a sectional view of one of the winding slots taken on the line II—II of Fig. 1;

Fig. 3 is a perspective view of the exposed end turns of the winding; and

In the arrangement shown there are four conductors in each slot indicated by the letters A, B, C, and D respectively. Each conductor comprises a pair of channel members 1 and 2, placed one over the other so as to form a longitudinal duct 3 between the two members. The individual conductors are separated by insulation strips 4 both within the slots and outside the slots. Metal wedges 5 hold the conductors in the slots.

Figure 1:
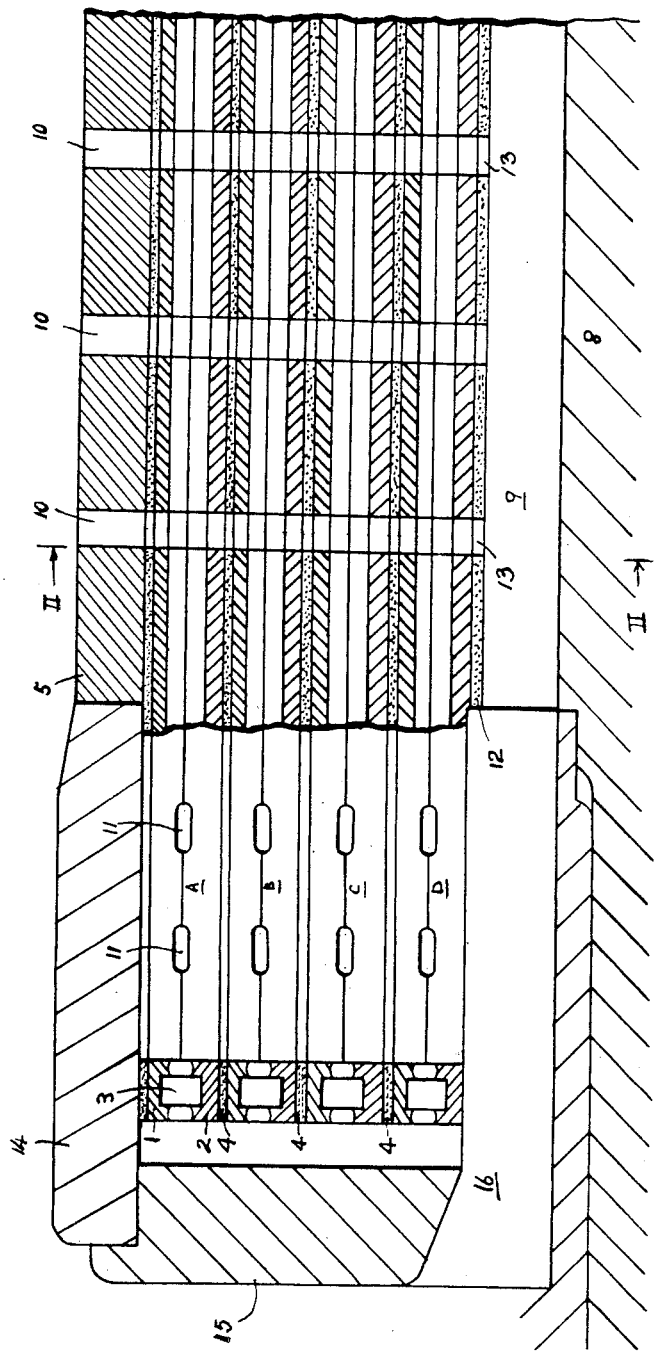
Fig. 1 is a longitudinal radial section of a winding slot of a rotor, taken on the line I—I of Fig. 2 and showing the construction at the end of the core; the section in this figure is broken along the exposed parts of the conductors to show this arrangement more clearly.

In Fig. 2 the reference 6 indicates teeth located at either side of the slot respectively. The reference 8 indicates the main rotor core; 9 is a sub-slot, i. e. the longitudinal duct extending beneath the main slot. Discharge passages 10 extend radially of the rotor core and through the conductors in each slot at spaced intervals along the core. Gas is fed into the conductor ducts 3 through inlet ports 11 formed in the sides of the conductors over the portions constituting the exposed end turns and which extend axially of the rotor. The gas flows along the ducts 3 and discharges from these through the radial discharge passages 10; in addition gas is fed into the ends of the sub-slots 9 and discharges out through the discharge passages 10. In Fig. 1, which shows the end of the rotor, the end two discharge passages 10 are blanked off from the sub-slots by an insulation strip 12, whereas for the remainder of the slots ports 13 are cut in the insulation strip 12, so that the sub-slots 9 can discharge through the passages 10.

The references 14 and 15 indicate the normal rotor end rings whilst 16 is an inlet to the sub-slot 9; the gas flow along the sub-slot can, for instance, be provided by a fan on the rotor shaft. If desired vertical passages can be formed through the end sections of the conductor so as to provide inlets for gas additional to the side ports 11.

It will be appreciated that whereas only four conductors per slot have been shown for simplicity, there will normally be appreciably more than this in actual construction.

Figure 4:
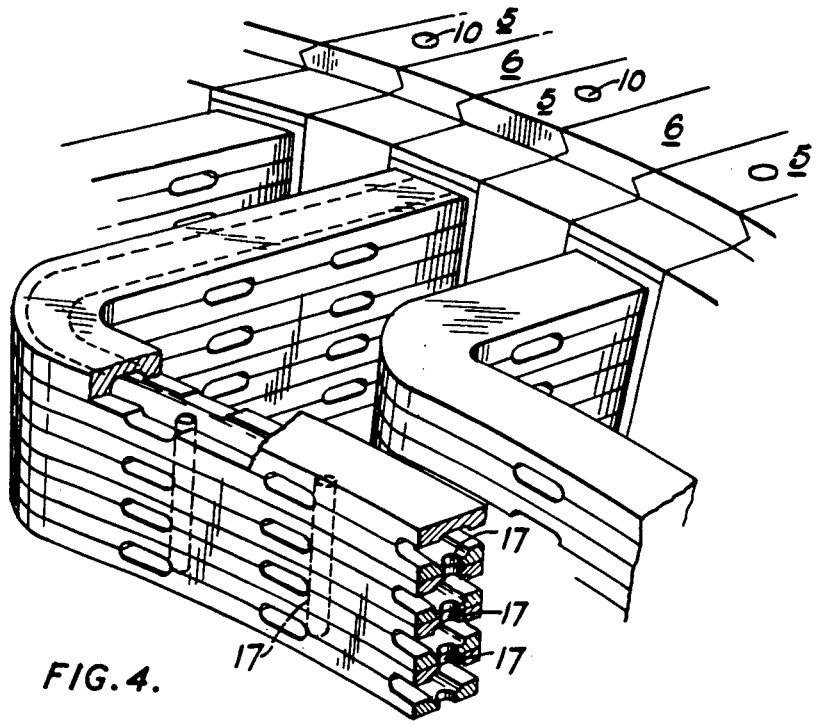
Figs. 4 and 5 are views similar to Fig. 3 showing modified ways of forming the end turns.

Fig. 4 shows a modification of the arrangement of end turns shown in Fig. 3, in which, in addition to the longitudinal ducts 3 in the conductors and the side ports 11, there are provided radial passages 17. These radial passages extend through the stack of conductors, with the exception of the radially outermost conductor, i. e. the top conductor strip as shown in the figure.

In the arrangement of Fig. 4, the radial passages 17 are shown in alignment with the side ports 11.

Figure 5:
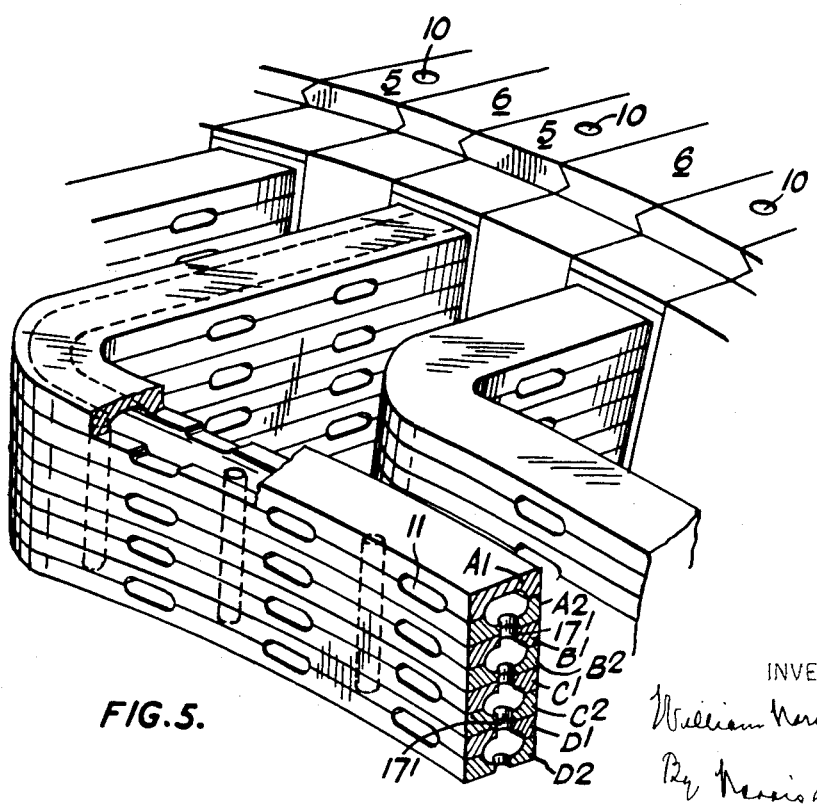

Fig. 5 shows an alternative arrangement in which the radial passages 17 are displaced from the ports 11, as indicated at 17' but communicate with them through intervening lengths of longitudinal ducts 3.

What I claim is:

1. A dynamo-electric machine comprising a stator and a rotor having a core formed with slots, a winding to the rotor comprising electrical conductors having portions embedded in said slots and portions forming exposed end turns extending beyond the ends of the rotor core and interconnecting related pairs of slots therein, longitudinal passages in said conductors extending both along said exposed end turns and also along said embedded portions of the conductors near an end of the rotor core, said conductors each consisting of channel members placed one over the other so as to form the longitudinal passage between them, separate inlet and outlet means to said longitudinal passages, said inlet means comprising inlet ports formed in the exposed end turns of the conductors and extending axially of the rotor core and said outlet means comprising outlet ports situated in the embedded portions of the conductors near an end of the rotor core and extending radially from said longitudinal passages to the rotor periphery, and additional inlet and outlet means in the exposed end turns of the conductors comprising passages extending radially of the rotor and directly through the conductors and communicating with the longitudinal passages therein.

2. A dynamo-electric machine comprising a stator and a rotor having a core formed with slots, a winding to said rotor comprising electrical conductors having portions embedded in said slots and portions forming exposed end turns extending beyond an end of the rotor core and interconnecting related pairs of slots, longitudinal passages in the conductors extending both along the exposed end turns and along the embedded portions of the conductors near an end of the rotor core, the conductors consisting of channel members placed one over the other so as to form a longitudinal passage between them, separate inlet and outlet means communicating with said longitudinal passages, said inlet means comprising inlet ports formed in said exposed end turns of the conductors and extending axially of the rotor and said outlet means comprising outlet ports situated in the embedded portions of the conductors near an end of the rotor core and extending radially of the rotor core from said longitudinal passages in the conductors to the rotor periphery, additional inlet and outlet means in the exposed end turns of the conductors comprising passages extending radially of the rotor core and directly through the conductors and communicating with the longitudinal passages therein, sub-slots beneath the winding slots and means for promoting a flow of cooling fluid along said sub-slots, and outlet means for said cooling fluid comprising outlet ports extending radially from said sub-slots through the conductors to the rotor periphery.

References Cited in the file of this patent

UNITED STATES PATENTS

| | | |
|---|---|---|
| 1,913,264 | Cornu | June 6, 1933 |
| 2,221,567 | Baudry | Nov. 17, 1940 |
| 2,653,255 | Baudry | Sept. 22, 1953 |
| 2,664,512 | Huntley | Dec. 29, 1953 |

FOREIGN PATENTS

| | | |
|---|---|---|
| 714,319 | France | Sept. 1, 1931 |
| 895,448 | France | Apr. 3, 1944 |